(12) United States Patent
Minamino

(10) Patent No.: US 7,720,314 B2
(45) Date of Patent: May 18, 2010

(54) IMAGE PROCESSING DEVICE AND IMAGE PROCESSING METHOD

(75) Inventor: Katsushi Minamino, Fushimi-ku (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 809 days.

(21) Appl. No.: 11/647,354

(22) Filed: Dec. 29, 2006

(65) Prior Publication Data

US 2007/0188775 A1    Aug. 16, 2007

(30) Foreign Application Priority Data

Feb. 13, 2006    (JP)    ............... 2006-035223

(51) Int. Cl.
    G06K 9/54    (2006.01)
    G06K 9/00    (2006.01)
    G06F 15/00   (2006.01)
(52) U.S. Cl. .................. 382/305; 382/100; 358/1.6
(58) Field of Classification Search ............. 382/305, 382/307, 100, 274; 358/1.6, 3.28, 1.14
    See application file for complete search history.

(56) References Cited

U.S. PATENT DOCUMENTS 7,099,036 B2 *   8/2006   Maeda et al. ............... 358/1.16
7,454,482 B2 *   11/2008  Barnard et al. ............. 709/220
2002/0144024 A1 * 10/2002 Kumpf et al. ............... 710/12
2004/0021903 A1 *  2/2004 Wanda ....................... 358/1.15

FOREIGN PATENT DOCUMENTS

JP    4-294682 A      10/1992
JP    2002-307776 A   10/2002
JP    2005-043531 A   2/2005

OTHER PUBLICATIONS

Japanese Office Action dated Aug. 7, 2008, issued in corresponding Japanese Patent Application No. 2006-035223.

* cited by examiner

*Primary Examiner*—Yon Couso
(74) *Attorney, Agent, or Firm*—Westerman, Hattori, Daniels & Adrian, LLP

(57) ABSTRACT

An image processing device inputs shading correction data, which can identify the image processing device itself, to a first hash function and generates comparison data. The image processing device inputs the shading correction data to a second hash function, and generates tracing identification data. The image processing device generates a tracing pattern from the tracing identification data, and adds the tracing pattern to output image data. The image processing device verifies the comparison data with standard data, which has been generated by inputting the shading correction data in a first function and previously stored in a storage device. When the comparison data matches the standard data, the image processing device permits to print out the output image data to which the tracing pattern has been added.

20 Claims, 7 Drawing Sheets

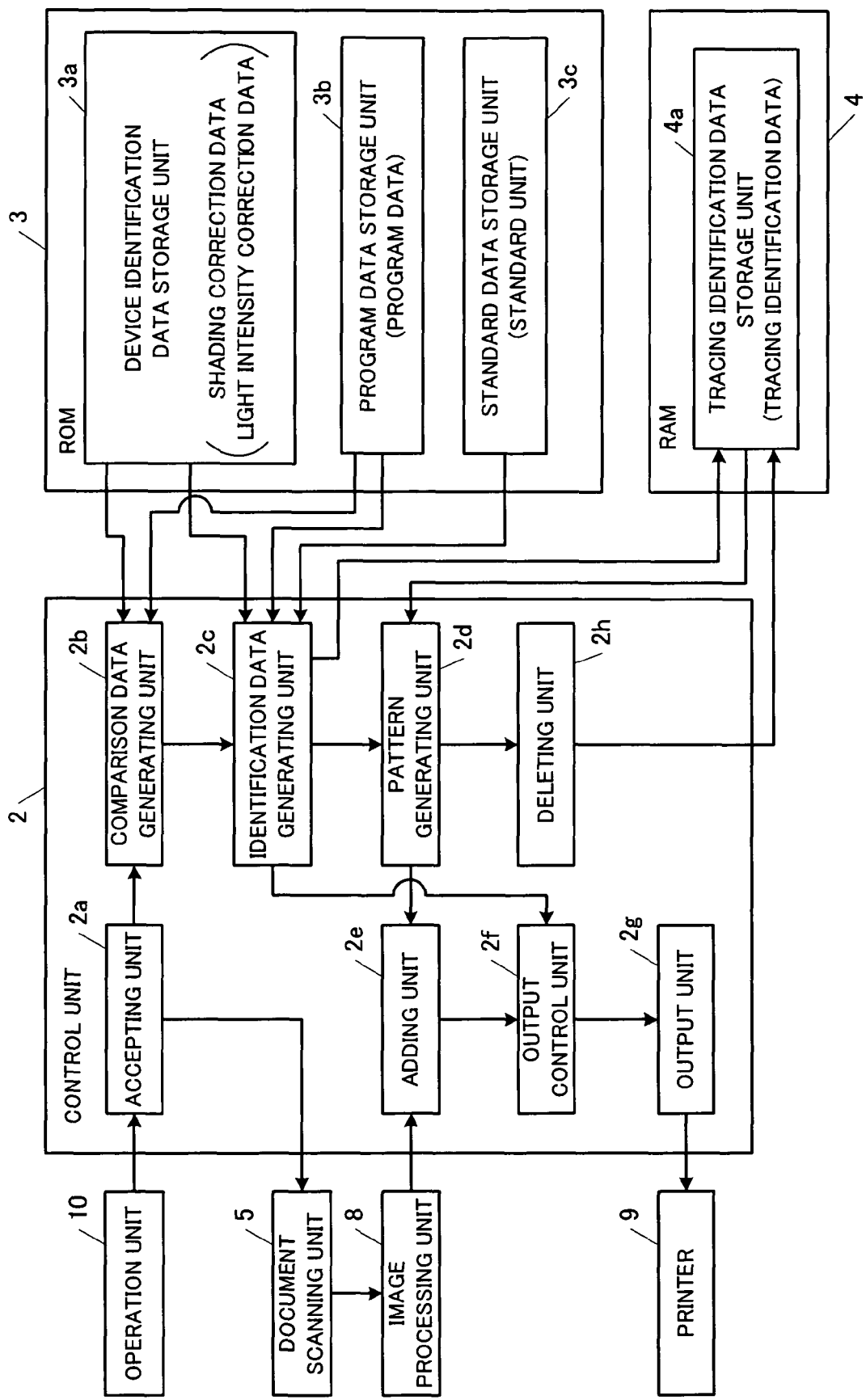

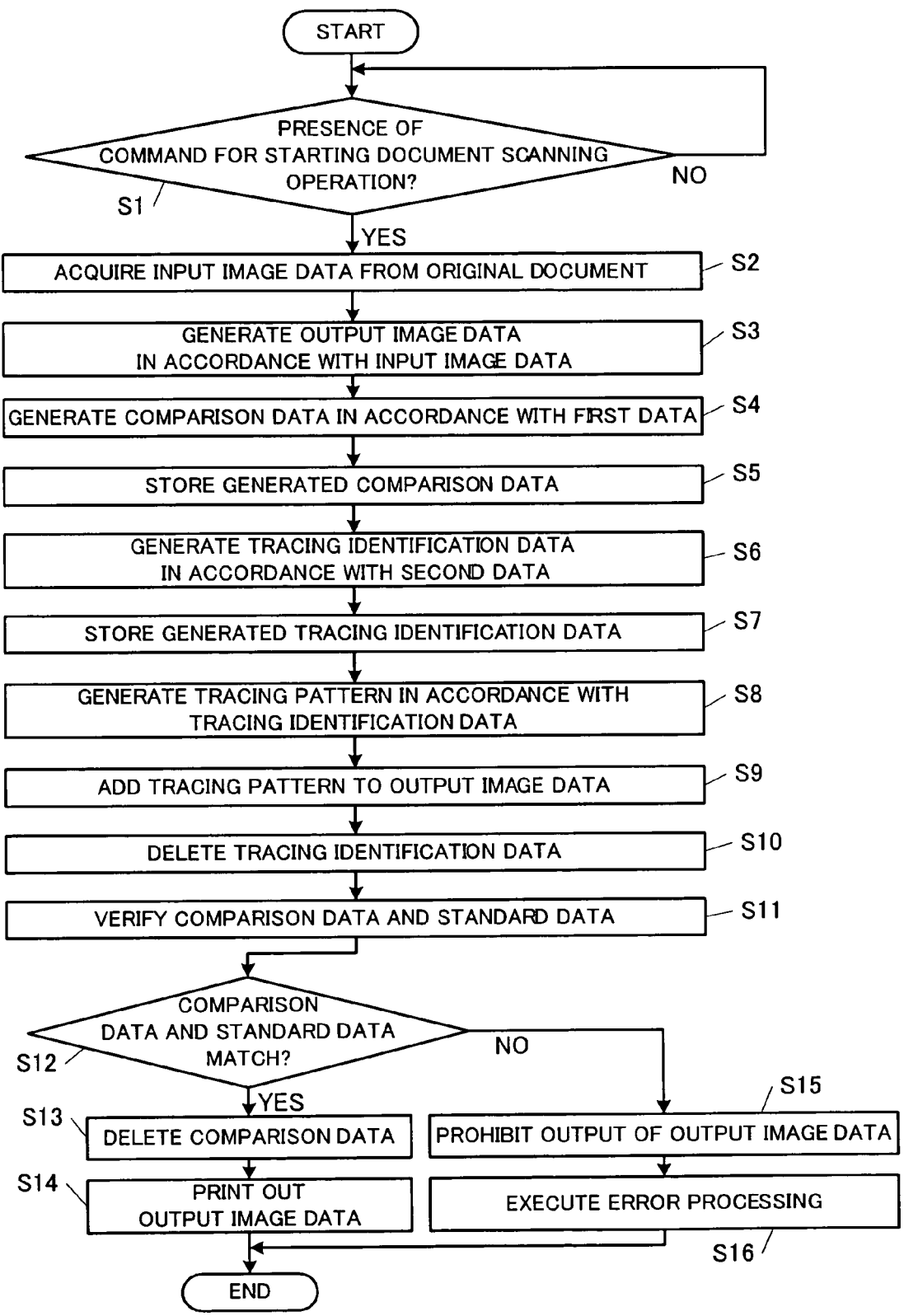

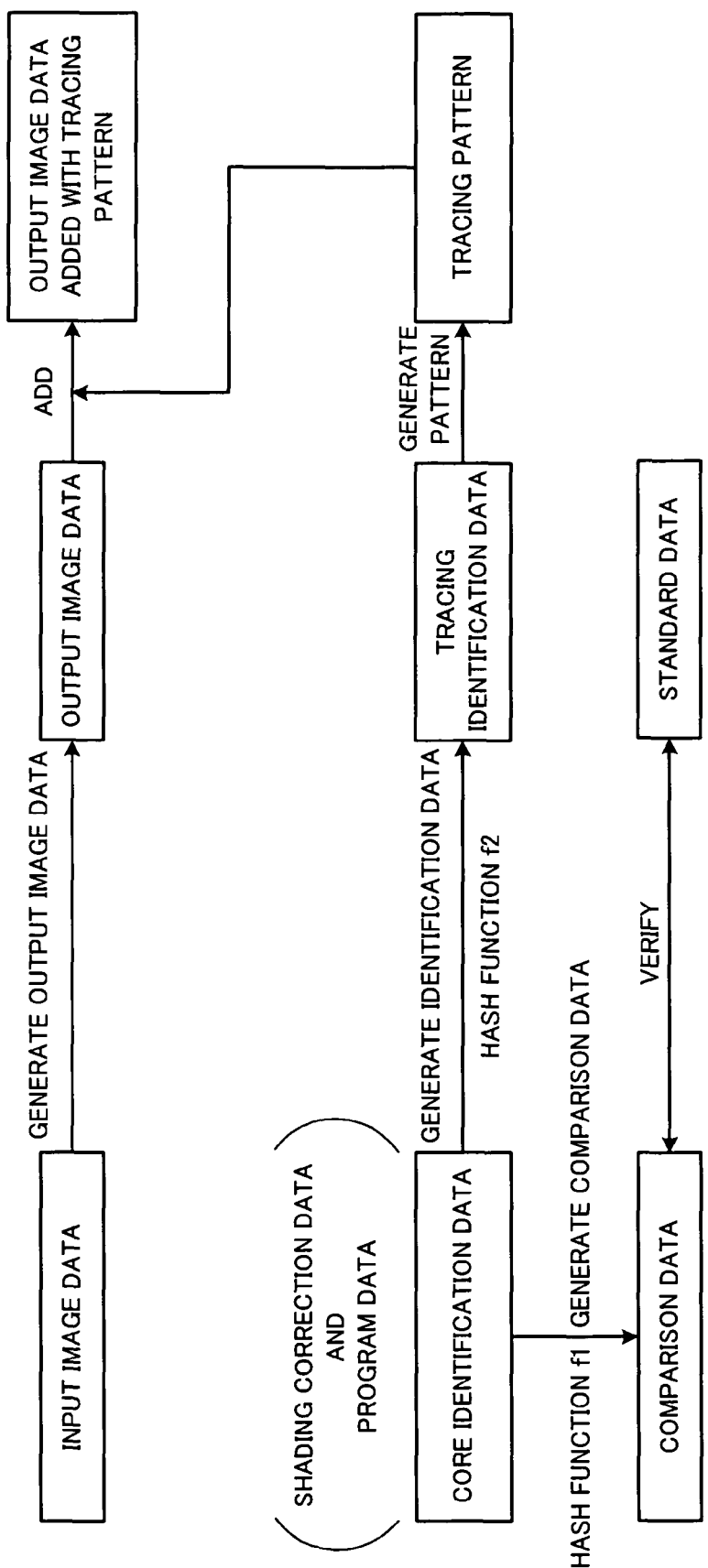

IMAGE PROCESSING DEVICE AND IMAGE PROCESSING METHOD

BACKGROUND OF THE INVENTION

1. Field of the Invention

The present invention relates to an image processing device and image processing method, and more particularly relates to an image processing device and an image processing method for adding identification data corresponding to the image processing device itself to output image data to specify a device used in counterfeiting paper money and securities or the like.

2. Description of the Related Art

A proposed image processing device generates output image data in accordance with input image data acquired by scanning an image of an original document, and generates a tracing pattern in accordance with identification data capable of identifying the image processing device. The image processing device adds the generated tracing pattern to the output image data, and prints out the output image data added with the tracing pattern as print data.

According to such an image processing device, by analyzing the tracing pattern, for example, by verifying the tracing pattern with information managed by a manufacturer or the like of the image processing device, it is possible to specify a device that has output the output image data. Accordingly, it is possible to specify a device used in counterfeiting paper money or the like. However, when the identification data is altered, a tracing pattern added to the output image data differs from the tracing pattern that should be added to the output image data. As a result, the device used in counterfeiting paper money or the like cannot be specified in accordance with the tracing pattern.

In order to prevent a tracing pattern, which differs from the tracing pattern that should be added to the output image data, from being added to the output image data, according to another proposal, determination standard data is previously stored as a standard for determining whether or not the identification data has been altered. Then, only when the identification data matches the determination standard data and it is confirmed that the identification data has not been altered, a tracing pattern is generated in accordance with the identification data and the generated tracing pattern is permitted to be added to the output image data.

However, in case of the above-described proposal, since the determination standard data identical with the identification data is stored, the identification data can be specified based on the determination standard data by analyzing data or program data stored in a memory. Accordingly, it is possible to alter the identification data and the determination standard data. When both the identification data and the determination standard data are altered, a tracing pattern corresponding to the altered identification data is added to the output image data. Therefore, even when the proposed determination as described above is carried out, it may be not possible to specify the device used in counterfeiting paper money or the like in accordance with the tracing pattern. When program data used for generating the identification data or the like is altered, altered identification data may be added to the output image data, and such output image data may be output.

SUMMARY OF THE INVENTION

In order to overcome the problems described above, preferred embodiments of the present invention provide an image processing device, which adds identification data of the image processing device itself to output image data, and more particularly, an image processing device in which the identification data is not easily altered, and even if the identification data is altered, the output image data added with the altered identification data can be prevented from being output.

According to one aspect of the present invention, an image processing device includes an output image generating unit, a device identification information storage unit, a standard information storage unit, a comparison information generating unit, a tracing identification information generating unit, an adding unit, an output unit, a determining unit, and a control unit. The output image generating unit generates an output image in accordance with an input image. The device identification information storage unit stores device identification information, which is information capable of identifying the image processing device itself. The standard information storage unit stores standard information. The comparison information generating unit generates comparison information in accordance with first information including the device identification information retrieved from the device identification information storage unit. The tracing identification information generating unit generates tracing identification information in accordance with second information including the device identification information retrieved from the device identification information storage unit. The tracing identification information has contents that differ from contents of the standard information. The adding unit adds the tracing identification information generated by the tracing identification information generating unit to the output image. The output unit outputs the output image. The determining unit determines whether or not the comparison information generated by the comparison information generating unit matches the standard information retrieved from the standard information storage unit. The control unit controls to prohibit the output image to be output by the output unit according to a determination result of the determining unit.

According to the above-described image processing device, even when the device identification information is altered and consequently the tracing identification information is altered, if the standard information has been generated based on the first information such that the standard information is identical with the comparison information, when the device identification information is altered, the standard information no longer matches the comparison information. Then, the determining unit can determine that the device identification information has been altered, and the control unit can prohibit the output image added with the altered tracing identification information from being output. Since the standard information differs from the tracing identification information, the standard information stored in the standard information storage unit is difficult to be specified based on the tracing identification information, and the tracing identification information is also difficult to be specified based on the standard information. Therefore, it is possible to prevent the determining unit from not making an accurate determination as a result of the standard information, which has been specified based on the tracing identification information added to the output image, being altered. Furthermore, it is possible to prevent the tracing identification information, which is generated based on the second information including the device identification information, from being altered as a result of the tracing identification information and consequently the device identification information being specified from the standard information stored in the standard information storage unit and being altered.

According to another aspect of the present invention, an image processing device includes an output image generating unit, a device identification information storage unit, a standard information storage unit, a comparison information generation unit, a tracing identification information generating unit, an adding unit, an output unit, a determining unit, and a control unit. The output image generating unit generates an output image in accordance with an input image. The device identification information storage unit stores device identification information, which is information capable of identifying the image processing device itself. The standard information storage unit stores standard information. The comparison information generating unit converts first information including the device identification information, which has been retrieved from the device identification information storage unit, according to a first function to generate comparison information. The tracing identification information generating unit converts second information including the device identification information, which has been retrieved from the device identification information storage unit, according to a second function to generate tracing identification information. The adding unit adds the tracing identification information, which has been generated by the tracing identification information generating unit, to an output image. The output unit outputs the output image. The determining unit determines whether or not the comparison information, which has been generated by the comparison information generating unit, matches the standard information, which has been retrieved from the standard information storage unit. The control unit controls to prohibit the output unit to output the output image according to a determination result of the determining unit.

According to the above-described aspect, since the comparison information is generated by converting the first information including the device identification information by the first function, the comparison information differs from the first information. Therefore, it becomes difficult to specify the first information from the comparison information, and it also becomes difficult to specify the device identification information from the first information. Thus, even when the standard information storage unit stores standard information that is identical with the comparison information, it is possible to prevent the device identification information from being specified from the standard information and prevent the device identification information from being altered. Moreover, since the tracing identification information is generated by converting the second information including the device identification information by the second function, the tracing identification information differs from the second information. Therefore, it becomes difficult to specify the second information from the tracing identification information added to the output image, and it also becomes difficult to specify the device identification information from the second information. Thus, it is possible to prevent the device identification information from being altered. Moreover, by providing the first function and the second function as different functions, even when the first information and the second information have the same contents, the standard information and the tracing identification information may be provided as information having different contents. As a result, the standard information stored in the standard information storage unit becomes difficult to be specified from the tracing identification information, and the tracing identification information also becomes difficult to be specified from the standard information.

According to one aspect of the present invention, in the image processing device, the first function and the second function are respectively a one-way function. Since the first function is a one-way function, even when the standard information is information having the same content as the comparison information, it is possible to efficiently prevent the first information and consequently the device identification information from being specified from the standard information stored in the standard information storage unit. As a result, it becomes difficult to alter the device identification information.

According to one aspect of the present invention, in the image processing device, the second function is a one-way function. Therefore, it is possible to efficiently prevent the second information and consequently the device identification information from being specified from the tracing identification information added to the output image. As a result, it becomes difficult to alter the device identification information.

According to one aspect of the present invention, the image processing device further includes a tracing identification information storage unit and a deleting unit. The tracing identification information storage unit stores the tracing identification information generated by the tracing identification information generating unit. After the adding unit adds the tracing identification information, which has been retrieved from the tracing identification information storage unit, to the output image, the deleting unit deletes the tracing identification information from the tracing identification information storage unit.

As described above, after the use of the tracing identification information, the tracing identification information is deleted from the tracing identification information storage unit. Therefore, it is extremely difficult to specify the tracing identification information. Thus, the second information and consequently the device identification information are also extremely difficult to be specified from the tracing identification information. As a result, it is possible to prevent the device identification information from being altered.

According to one aspect of the present invention, the image processing device further includes a scanning unit which scans an image of an original document to generate an input image. The device identification information includes correction information unique to the image processing device itself to be used in a processing for generating an output image that is true to the image of the original document in the processing for generating the output image by the output image generating unit.

Therefore, when the correction information included in the device identification information is altered, it becomes impossible to obtain the output image that is true to the image of the original document. Accordingly, even when the device identification information is altered and the image processing device itself cannot be specified from the tracing identification information added to the output image generated by scanning an original document such as paper money, it is possible to prevent an abuse of the output image of the counterfeit paper money or the like.

According to one aspect of the present invention, in the image processing device, as the correction information, the device identification information includes shading correction information used for a shading correction of the input image. The shading correction of the input image is carried out based on the shading correction information included in the device identification information. Therefore, when the shading correction information included in the device identification information is altered, the shading correction cannot be carried out normally, and an output image that is true to the image of the original document cannot be obtained. Accordingly, even when the device identification information is altered and the image processing device itself cannot be specified based on the tracing identification information added to the output image generated by scanning an original document such as paper money, it is possible to prevent an abuse of the output image or the counterfeit paper money or the like on which the output image has been printed.

In the image processing device, the output unit adjusts emission energy of each of a plurality of printing elements, and forms an image based on the output image onto printing paper. The device identification information includes light intensity correction information unique to the image processing device itself to be used for a processing for correcting variation in light intensity among the plurality of the printing elements.

Therefore, when the light intensity correction information included in the device identification information is altered, the variation in the light intensity among the plurality of the printing elements is not normally corrected. As a result, a quality of the image formed on the printing paper deteriorates. Accordingly, even when the printing paper on which the image of the paper money or the like has been formed is output, it is possible to prevent such printing paper from being abused as the counterfeit paper money.

In the image processing device, the first information includes program data for executing a processing included in a series of processing from scanning of an image of an original document by the scanning unit to outputting of an output image by the output unit. The program data also causes the image processing device itself to not operate normally when being altered.

Accordingly, when the program data is altered, the standard information does not match the comparison information. As a result, it is possible to prevent an output of an output image, which has not been generated by proper processing.

In the image processing device, the second information includes program data for executing a processing included in a series of processing from scanning of an image of an original document by the scanning unit to outputting of an output image by the output unit. The program data also causes the image processing device itself to not operate normally when being altered.

Accordingly, when the program data is altered, it is possible to prevent an output image added with altered tracing identification information from being output normally.

In the image processing device, the program data includes program data of at least one of the following programs: a tracing identification information generating program for functionally realizing the tracing identification information generating unit, a comparison information generating program for functionally realizing the comparison information generating unit, and an adding program for functionally realizing the adding unit.

Therefore, when the program data of the tracing identification information generating program is altered and proper tracing identification information cannot be generated, the standard information and the comparison information do not match. As a result, it is possible to prevent an output of an output image added with improper, i.e., altered tracing identification information. When the comparison information generating program is altered and improper comparison information is generated, the standard information and the comparison information do not match. As a result, it is possible to prevent an output of an output image added with tracing identification information, which has been altered by passing through a determination of the determining unit due to improper comparison information being generated. When the program data of the adding program is altered and the tracing identification information is not normally added to the output image, the standard information and the comparison information do not match. As a result, it is possible to prevent an output of an output image to which the tracing identification information has not been added normally.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 is a functional block diagram of essential portions of the present invention.

FIG. 4 is a flowchart illustrating an operation carried out by the Internet facsimile machine in case of a presence of a command for starting a document scanning operation.

FIGS. 5A and 5B illustrate a process for generating composed image data.

DETAILED DESCRIPTION OF PREFERRED EMBODIMENTS

Figure 1:
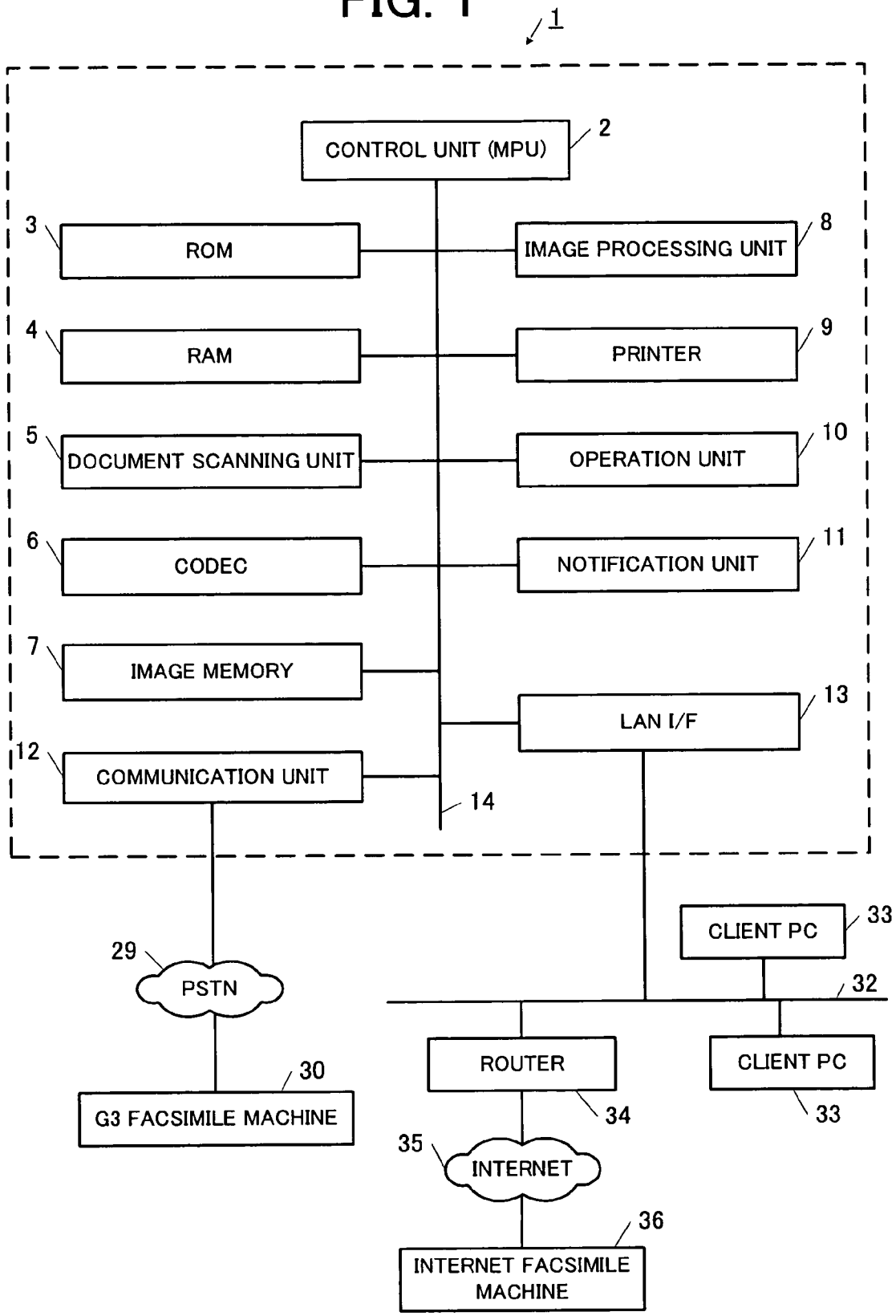
FIG. 1 is a block diagram illustrating an example of a configuration on an Internet facsimile machine according to a preferred embodiment of the present invention.
Figure 2:
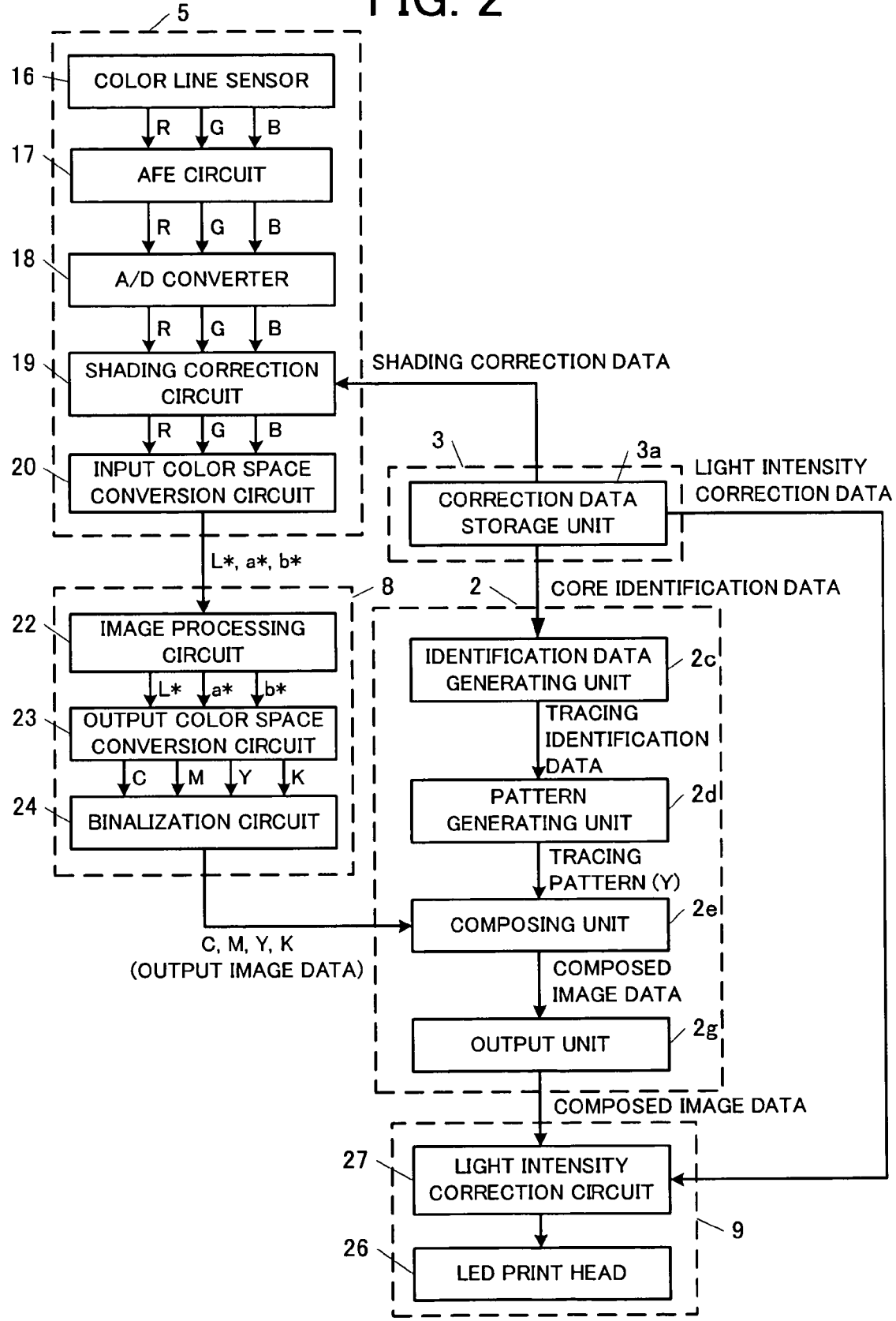
FIG. 2 is a block diagram illustrating a flow of a data processing when copying an original document by the Internet facsimile machine.
Figure 5A:
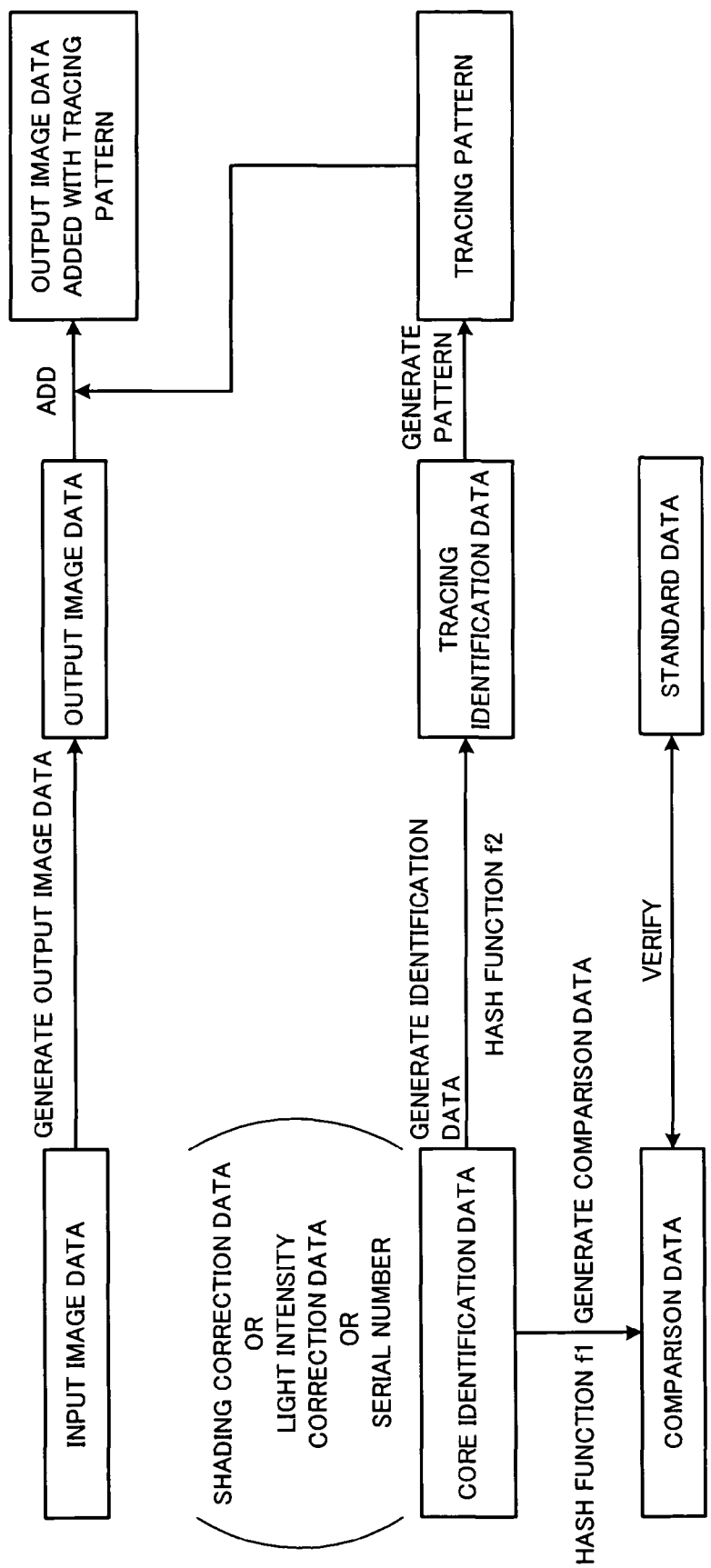

With reference to the drawings, an Internet facsimile machine 1 according to a preferred embodiment of the present invention (an example of preferred embodiments of an image processing device according to the present invention) will be described. FIG. 1 is a block diagram illustrating an example of a configuration of the Internet facsimile machine 1. FIG. 2 is a block diagram illustrating a flow of a data processing when copying an original document by the Internet facsimile machine 1.

As illustrated in FIG. 1, the Internet facsimile machine 1 includes a control unit (Micro Processing Unit (MPU)) 2, a Read Only Memory (ROM) 3, a Random Access Memory (RAM) 4, an image scanning unit 5, a Coder and Decoder (CODEC) 6, an image memory 7, an image processing unit 8, a printer 9, an operation unit 10, a notification unit 11, a communication unit 12, and a Local Area Network Interface (LAN I/F) 13. Each of the units 2 through 13 is connected via a bus 14 in a manner that communication can be carried out.

The control unit 2 controls an operation of each of the units of the Internet facsimile machine 1 in accordance with a control program stored in the ROM 3. The ROM 3 is a read-only nonvolatile memory, which stores the control program or the like for controlling the operation of each of the units of the Internet facsimile machine 1 by the control unit 2. The RAM 4 temporarily stores various data, such as setting information, used for the operation of the Internet facsimile machine 1.

The document scanning unit 5 scans an image of an original document to generate input image data (or an input image). Although not illustrated in the drawings, the document scanning unit 5 includes a Flat Bed Scanner and/or an Automatic Document Feeder (ADF). Further, the FBS scans an original document placed on a transparent document platen, and the ADF transports an original document placed on a document tray to scan the original document. As illustrated in FIG. 2, the document scanning unit 5 includes a color line sensor 16, an Analog Front End (AFE) circuit 17, an Analog-to-Digital (A/D) converter 18, a shading correction circuit 19, and an input color space conversion circuit 20.

The color line sensor 16 scans an image of an original document to generate input image data. The FBS includes the color line sensor 16. Although not illustrated in the drawings, the color line sensor 16 includes Red (R), Green (G), and Blue (B) color line sensors. When the color line sensor 16 scans an original document, analog image signals (input image data) of three color components R, G, and B, which have been generated by converted light signals into electric signals, are output to a prescribed output destination.

The AFE circuit 17 carries out a gain adjustment for amplifying the input image data output from the color line sensor 16. The A/D converter 18 executes an A/D conversion on data of each color component of the input image data of which the gain has been adjusted by the AFE circuit 17. Further, in the present preferred embodiment, each pixel data of the color image data (input image data) of an RGB color coordinate system, which has been obtained by carrying out the A/D conversion, is data of eight bits (pixel value is 256 tones). In the present preferred embodiment, an example in which each pixel data is eight bits will be described. However, the present invention is not limited to such an example, and each pixel data may be ten bits or twelve bits.

The shading correction circuit 19 executes a shading correction on the input image data of the original document output from the A/D converter 18. Further, the shading correction is a process for correcting unevenness in light intensity of a light source, influence of optical components, and variation in sensitivity of light receiving elements of the color line sensor 16. The shading correction is carried out by shading correction data stored in the ROM 3.

The shading correction data includes white shading correction data and black shading correction data. The white shading correction data is generated prior to a shipment of the Internet facsimile machine 1 from a factory by scanning a white reference plate (not illustrated) by the color line sensor 16. Further, the white reference plate is provided inside the FBS and along a main scan direction of when scanning an original document, and light from the light source is irradiated on the white reference plate. The black shading correction data is also generated prior to the shipment by scanning the white reference plate by the color line sensor 16 while the light source is turned out.

A white fluorescent lamp or a cold cathode ray tube or the like is used for the light source that irradiates light on the original document or the white reference plate. Therefore, the light intensity of the light source varies over time. The white shading correction data is data determined according to the light intensity of the light source at certain time. Therefore, the light intensity of the light source when the white shading correction data has been determined may be different from the light intensity of the light source when an original document is actually scanned. Thus, when the white shading correction data, which has been generated at the shipment and stored in the ROM 3, is directly used for the shading correction of the input image data, an appropriate shading correction may not be carried out. Therefore, the shading correction circuit 19 modifies the white shading correction data, and carries out a shading correction. That is, also prior to the scanning of an original document, the color line sensor 16 scans the white reference plate and obtains modification data for modifying the white shading correction data stored in the ROM 3.

The shading correction circuit 19 modifies the white shading correction data stored in the ROM 3 by the modification data. Then, the shading correction circuit 19 uses the modified white shading correction data to carry out the shading correction of the input image data output from the A/D converter 18. Further, also for the black shading correction data, modification data may be obtained and the shading correction may be carried out by the obtained modification data. The above mentioned shading correction data is unique to the Internet facsimile machine 1 itself, and it is possible to identify the Internet facsimile machine 1 based on the shading correction data.

The input color space conversion circuit 20 carries out a color space conversion to convert the input image data of the RGB color coordinate system into, for example, input image data of a L*a*b* color coordinate system. Further, the color coordinate system to be used is not limited to the L*a*b* color coordinate system. For example, the color coordinate system may be YCrCb color coordinate system.

The CODEC 6 encodes the input image data output from the document scanning unit 5, and also decodes encoded image data. The image memory 7 stores the input image data encoded by the CODEC 6 and/or received image data or the like. The input image data output from the document scanning unit 5 is input to the CODEC 6 via a prescribed processing (for example, an image processing by the image processing unit 8). Then, the CODEC 6 encodes the input image data in accordance with the Joint Photographic Experts Group (JPEG), the Modified Huffman (MH), the Modified Read (MR), the Modified MR (MMR), the Joint Bi-level Image experts Group (JBIG) method or the like. The encoded image data is stored in the image memory 7.

The image processing unit 8 executes a prescribed image processing on the input image data (an input image) output from the document scanning unit 5 to generate output image data (an output image). As illustrated in FIG. 2, the image processing unit 8 includes an image processing circuit 22, an output color space conversion circuit 23, and a binalization circuit 24.

The image processing circuit 22 executes an image processing, such as a color adjustment, an expansion/compression processing, a binding margin processing, a rotation processing, a mirror processing, or a frame deletion processing, as needed on the input image data of the L*a*b* color coordinate system output from the document scanning unit 5. Further, the color adjustment includes a lightness adjustment, a hue adjustment, and/or a color saturation adjustment or the like.

The output color space conversion circuit 23 carries out a color space conversion to convert the input image data into the output image data. Specifically, the output color space conversion circuit 23 carries out a color space conversion for converting the input image data of the L*a*b* color coordinate system, which has been executed with a necessary image processing by the image processing circuit 22, into each color data of Cyan (C), Magenta (M), Yellow (Y), and black (K) or the like. Accordingly, the output color space conversion circuit 23 generates output image data including such color data.

The binarization circuit 24 executes an error diffusion processing or the like to binarize the output image data, which has been generated by the output color space conversion circuit 23. The tracing pattern generated by the control unit 2 is added to the binalized output image data, and the output image data added with the tracing pattern is sent to the printer 9. Then, the printer 9 forms an image onto printing paper in accordance with the output image data. Further, in the present preferred embodiment, after binalizing the output image data, the tracing pattern is added to the binalized output image data. However, the tracing pattern may be added to the output image data prior to binarization, and the output image data added with the tracing pattern may be binalized. In this case, the tracing pattern preferably includes a maximum possible value for the CMYK data of the output image data (when pixel data is eight bits, the maximum possible value is 255). Moreover, in the above-described preferred embodiment, the binarization circuit 24 binarized the output image data. However, instead of binarizing, a four-value conversion may be executed.

The printer 9 forms an image onto printing paper in accordance with the output image data to which the tracing pattern has been added. In the present preferred embodiment, the printer 9 adjusts luminance energy of each of a plurality of printing elements (for example, a plurality of Light Emitting Diode (LED) elements), and forms an image corresponding to the output image data onto the printing paper. That is, the printer 9 is an LED printer using an LED array, which includes a plurality of the LED elements arranged in a straight light, as a light writable light source for forming an electrostatic latent image on the surface of a photoconductive drum. As illustrated in FIG. 2, the printer 9 includes an LED print head 26 and a light intensity correction circuit 27.

Although not illustrated in the drawings, the LED print head 26 includes a shift register, and a latch unit or the like in addition to the LED array. Further, the shift register sequentially stores the input output image data one line at a time. The latch unit is a memory which latches the output image data of one line stored in the shift register. The LED array carries out a light emitting operation in accordance with the output image data of one line stored in the latch unit, and forms an electrostatic latent image on the surface of the photoconductive drum. The printer 9 adheres toner onto the electrostatic latent image formed on the surface of the photoconductive drum to form a visible toner image. Then, the printer 9 transfers the toner image onto paper, and forms an image of the output image data on the printing paper.

The light intensity correction circuit 27 uses the light intensity correction data stored in the ROM 3 to execute a light intensity correction on the output image data added with the input tracing pattern. Further, the light intensity correction is a processing for correcting variation in the light intensity among a plurality of the LED elements of the LED print head 26. After the light intensity correction is executed, the output image data is printed out using the LED print head 26. The light intensity correction data is data unique to the Internet facsimile machine 1 itself, and the Internet facsimile machine 1 itself can be identified based on the light intensity correction data. Further, in the present preferred embodiment, a description will be made of an example in which the output image data added with the tracing pattern is printed out. However, it is also possible to print out image data (output image data) to which a tracing pattern is not added.

Although not illustrated in the drawings, the operation unit 10 includes various operation keys, which operates in conjunction with the notification unit 11. For example, the operation keys are a start key, a ten-key numeric pad, and a cursor key. The start key is operated to instruct the document scanning unit 5 to start a scanning operation of an original document. The ten-key numeric pad is operated to input a facsimile number, and a number of sets of copies, or the like. The cursor key is operated to carry out various settings. The notification unit 11 includes a touch-screen Liquid Crystal Display (LCD), an LED lamp, and/or a speaker or the like. Further, various setting status and an operation status or the like of the Internet facsimile machine 1 are displayed with characters and figures by the LCD, or displayed by turning the LED lamp on and off. Alternatively, a speaker may output a prescribed warning sound.

The communication unit 12 transmits and/or receives image data of an original document by facsimile. The communication unit 12 includes a Modulator-Demodulator (MODEM) and a Network Control Unit (NCU). The MODEM modulates and demodulates transmission data and received data in accordance with the International Telecommunication Union-Telecommunications (ITU-T) recommendation V.34 standard or anything similar to this. The NCU is a communication network control device which makes a telephone call or disconnects a telephone call by controlling a telephone line. The NCU is connected to a Public Switched Telephone Network (PSTN) 29. The PSTN 29 is connected to a G3 facsimile machine 30 in a manner that communication can be carried out. The Internet facsimile machine 1 transmits and receives image data by facsimile to and from the G3 facsimile machine 30.

The LAN I/F 13 is an interface for connecting a LAN 32 and the Internet facsimile machine 1 in a manner that communication can be carried out. A client Personal Computer (PC) 33 is provided on the LAN 32. The client PC 33 can use various functions of the Internet facsimile machine 1. For example, the printer 9 of the Internet facsimile machine 1 can print out image data forwarded from the client PC 33. As another example, image data processed by the Internet facsimile machine 1 can be forwarded to the client PC 33. A router 34 is also connected to the LAN 32. An Internet facsimile machine 36 is connected to the LAN 32 via the router 34 and the Internet 35. Therefore, the Internet facsimile machine 1 can carry out Internet facsimile communication with another Internet facsimile machine 36 via the Internet 35 by transmitting or receiving electronic mail attached with image data.

In addition to the copy function, the facsimile communication function, and the Internet facsimile communication function, the Internet facsimile machine 1 also includes a function for generating output image data in accordance with input image data scanned from an original document and adding a tracing pattern, which can be used to identify the Internet facsimile machine 1, to the generated output image data, and a function for printing out the output image data to which the tracing pattern has been added. Accordingly, the Internet facsimile machine 1 can suppress counterfeit actions such as reproduction of paper money, securities, or the like.

FIG. 3 is a functional block diagram illustrating essential portions of the present invention. The control unit 2 of the Internet facsimile machine 1 functionally includes an accepting unit 2a, a comparison data generating unit 2b, an identification data generating unit 2c, a pattern generating unit 2d, an adding unit 2e, an output control unit 2f, an output unit 2g, and a deleting unit 2h. The ROM 3 of the Internet facsimile machine 1 functionally includes a device identification data storage unit 3a, a program data storage unit 3b, and a standard data storage unit 3c. The RAM 4 functionally includes a tracing identification data storage unit 4a.

The control unit 2 retrieves and executes a control program previously stored in the ROM 3 to function as a function unit including the accepting unit 2a, the comparison data generating unit 2b, the identification data generating unit 2c, the pattern generating unit 2d, the adding unit 2e, the output control unit 2f, the output unit 2g, and the deleting unit 2h. The control unit 2 controls to function the ROM 3 as a function unit including the device identification data storage unit 3a, the program data storage unit 3b, and the standard data storage unit 3c. The control unit 2 also controls to function the RAM 4 as the tracing identification data storage unit 4a.

The device identification data storage unit 3a of the ROM 3 stores device identification data, which is data capable of identifying the Internet facsimile machine 1 itself. The device identification data includes correction data or the like unique to the Internet facsimile machine 1 itself to be used in a processing for generating output image data that is true to an image of an original document. Shading correction data is an example of such correction data unique to the Internet facsimile machine 1 itself to be used in the processing for generating the output image data that is true to the image of the original document. The data, which is stored in the device identification data storage unit 3a and capable of identifying the Internet facsimile machine 1 itself, includes light intensity correction data or the like for correcting variation in the light intensity (light emitting volume) among the plurality of the printing elements of the LED array of the printer 9.

The shading correction data is data to be used for a shading correction of input image data formed by scanning an image of an original document. That is, the shading correction data is data used in the shading correction carried out by the shading correction circuit 19 with respect to the input image data. The shading correction data is data of one line in the main scan direction when the document scanning unit 5 scans an image of an original document.

The shading correction data is previously written in the ROM 3 at a shipment of the Internet facsimile machine 1 from the factory. Further, since the input image data of which the shading is to be corrected is color image data including three color components R, G, and B, the device identification data storage unit 3a stores shading correction data of three lines R, G, and B for each color component.

The shading correction data, which is stored in the device identification data storage unit 3a of the ROM 3, and the modification data are used in the shading correction carried out by the shading correction circuit 19 as described above. As described above, the shading correction data includes the white shading correction data and the black shading correction data. Either one or both of the white shading correction data and the black shading correction data can be used as the device identification data.

Further, in the present preferred embodiment, the shading correction data used in the shading correction is stored in the device identification data storage unit 3a of the ROM 3. However, if a memory previously storing the shading correction data is a read-only nonvolatile memory, the memory is not limited to the device identification data storage unit 3a. For example, the shading correction circuit 19 may include a memory having a read-only area, and the shading correction data may be stored in such a memory.

The light intensity correction data is data for correcting variation in the light intensity among the plurality of the printing elements (plurality of the LED elements). That is, the light intensity correction data is data used by the light intensity correction circuit 27 to correct light intensity of the output image data to which the tracing pattern has been added. The light intensity correction data is data of one line in a direction in which the plurality of the LED elements of the LED print head 26 are arranged (the main scan direction). The light intensity correction data is previously written in the ROM 3 at a shipment of the Internet facsimile machine 1 from the factory.

Further, in the present preferred embodiment, the output image data added with the tracing pattern, which is to be a basis of an image to be formed on the printing paper by the printer 9, is data including four color data of C, M, Y, and K. The device identification data storage unit 3a stores light intensity correction data of four color components C, M, Y, and K (for four lines) for each color component.

In the present preferred embodiment, the device identification data storage unit 3a of the ROM 3 stores light intensity correction data used for correcting light intensity. However, a memory for previously storing the light intensity correction data is not limited to the correction data storage unit 3a if the memory is a read-only nonvolatile memory. For example, the LED print head 26 may include a read-only correction data storage memory, and such a memory may store the light intensity correction data.

The program data storage unit 3b stores a control program including program data for executing a processing included in a series processing from scanning of an image of an original document, generating of an input image and outputting (for example, printing out onto printing paper) of an output image. The program data also causes the Internet facsimile machine 1 to not operate normally when being altered. Specifically, the program data storage unit 3b stores a comparison data generating program for functionally realizing the comparison data generating unit 2b, an identification data generating program for functionally realizing the identification data generating unit 2c, a pattern generating program for functionally realizing the pattern generating unit 2d, and a composing program for functionally realizing the adding unit 2e.

A serial number (identification number data of the Internet facsimile machine 1 itself) is stored in a prescribed area of the ROM 3. Further, the serial number is data assigned to enable the Internet facsimile machine 1 to be distinguished from other machines. The serial number is previously written in the ROM 3 along with the shading correction data and the light intensity correction data at the shipment of the Internet facsimile machine 1 from the factory.

The standard data storage unit 3c stores standard data. The standard data is data used for determining whether or not the device identification data has been altered. For example, the standard data is data which has been converted from first data including at least the device identification data according to a first function.

The first data may include only the device identification data. The first data may also include program data or the like, which is stored in the program data storage unit 3b for executing a processing included in a series of processing from scanning of an image of an original document, generating of an input image and outputting (for example, printing out onto printing paper) of an output image, and which causes the Internet facsimile machine 1 to not operate normally when being altered. In the present preferred embodiment, a description will be made on an example in which the first data includes only the device identification data.

The first function is a one-way function. In the present preferred embodiment, the first function is a hash function (hereinafter referred to as a "hash function f1"). When using the shading correction data stored in the device identification data storage unit 3a as the device identification data, standard data is data (hash value) converted from the shading correction data according to the hash function f1. Further, the standard data is previously written in the ROM 3 prior to the shipment of the Internet facsimile machine 1 from the factory.

For example, the accepting unit 2a of the control unit 2 accepts a scanning condition of an original document, and/or a command for starting a scanning operation of the original document, which have been input via the operation unit 10.

The comparison data generating unit 2b converts first data according to the first function, and generates comparison data. Further, the first data includes at least the device identification data retrieved from the device identification data storage unit 3a. Specifically, the comparison data generating unit 2b inputs the shading correction data, which is stored in the device identification data storage unit 3a, in the hash function f1. Accordingly, the comparison data generating unit 2b generates comparison data to be verified with the standard data, which is stored in the standard data storage unit 3c, when determining whether or not the shading correction data as the device identification data has been altered.

Therefore, when the device identification data (in the present preferred embodiment, the shading correction data) stored in the device identification data storage unit 3a has not been altered, the comparison data matches the standard data in the determination. Further, although the generated comparison data is temporarily stored in a prescribed area in the RAM 4, the comparison data is deleted from the RAM 4 after the determination is completed. Instead of generating the comparison data by converting the first data according to the first function, the first data may be used directly as comparison data. In this case, the standard data also has the same content as the first data.

Although the features of the hash function are well-known, in the present preferred embodiment, the first data including an arbitrary number of digits can be converted into comparison data (hash value) including a prescribed number of digits (for example, ten digits). The first data, which is the original data, cannot be specified from the converted comparison data (one-way feature). Even when only a slight portion of the first data is altered, comparison data obtained by converting such first data differs from the comparison data obtained by converting non-altered first data. A possibility in which different original data (first data) is converted into the same hash value is extremely low. In addition, it is extremely difficult to create a plurality of different original data (first data) including the same hash value (comparison data).

The identification data generating unit 2c converts second data according to a second function, and generates tracing identification data. Further, the second data includes at least the device identification data retrieved from the device identification data storage unit 3a. The second data may include only the device identification data. Alternatively, the second data may include the device identification data, and program data, which is stored in the program data storage unit 3b and executes a processing included in a series of processing from scanning of an image of an original document, generating of an input image and outputting (for example, printing out onto printing paper) of an output image, and which causes the Internet facsimile machine 1 to not operate normally when being altered.

Further, the second data and the first data may include identical contents or different contents. Even when the second data and the first data include different contents, both second data and the first data include the device identification data. However, in the present preferred embodiment, a description will be made of an example in which the second data includes only the device identification data. The identification data generating unit 2c inputs the shading correction data (an example of the device identification data) to a hash function f2 (an example of the second function), which differs from the hash function f1 (an example of the first function). Accordingly, the identification data generating unit 2c generates tracing identification data. The tracing identification data is data to be added to the output image data as a tracing pattern such that a device that has generated or output the output image data can be specified. The generated tracing identification data is stored in the tracing identification data storage unit 4a.

The first function (in the present preferred embodiment, the hash function f1) and the second function (in the present preferred embodiment, the hash function f2) are preferably different functions. In this case, the standard data, which is generated by converting the first data according to the first function, differs from the tracing identification data, which is generated by converting the second data according to the second function. Therefore, it is extremely unlikely that the tracing identification data is specified based on the standard data stored in the standard data storage unit 3c as determination data, and the device identification data is specified based on the specified tracing identification data.

Further, instead of converting the second data according to the second function to generate the tracing identification data, the second data may be used directly as the tracing identification data. Also in this case, the standard data differs from the second data (the device identification data (in the present preferred embodiment, the shading correction data)). Therefore, it is extremely unlikely that the device identification data is specified based on the standard data.

For example, when scanning a Japanese Industrial Standards (JIS) A3-sized original document by a resolution of 600 dpi, a number of pixels in the main scan direction is 7016 pixels. Therefore, for example, when one pixel is eight bits, the device identification data storage unit 3a stores shading correction data of approximately 7000 pixels for three lines R, G, and B. When one pixel is four bits, the device identification data storage unit 3a stores light intensity correction data of approximately 7000 pixels for four lines C, M, Y, and K. That is, the shading correction data and the light intensity correction data stored in the correction data storage unit 3a are formed of data of a plurality of bits corresponding to each pixel of the input image data.

The second data includes data of a portion of bits among data of a plurality of bits constituting the device identification data stored in the device identification data storage unit 3a. The identification data generating unit 2c generates tracing identification data based on such second data. That is, the identification data generating unit 2c generates tracing identification data based on bits corresponding to higher digits in a value indicated by the data of the plurality of bits constituting the device identification data.

For example, when using only the shading correction data as the second data (i.e., when third core identification data is the device identification data), data of high-order three bits is extracted from the data including eight bits per pixel. Then, a set of the extracted data of high-order three bits (for 7016 pixels) is input in the hash function f2. That is, the tracing identification data is generated based on high-order bits among the bits constituting the shading correction data. Further, the high-order bits greatly influence the input image data, to which the shading correction is to be executed, when being altered. When the data per pixel of the shading correction data is formed of data of at least two bytes and the data is stored in the device identification data storage unit 3a under a big endian method, a portion of high-order bits among highest-order bits is input to the hash function f2 to generate the tracing identification data.

When the data is stored in the device identification data storage unit 3a under a little edian method, a portion of high-order bits among lowest-order bits is input to the hash function f2 to generate the tracing identification data. Accordingly, when the second data and consequently the tracing identification data generated based on the second data are altered due to a portion included in the second data being specified among the shading correction data, which is the device identification data, and the specified portion being altered, the shading-corrected input image data results being extremely abnormal.

Further, in the present preferred embodiment, the first function and the second function are hash functions. However, if the first function and the second function are functions which can reduce a number of bits (data volume) of the first data and the second data, the first function and the second function are not limited to the hash functions. For example, the first function and the second function may be functions which carry out an encoding process, a compression process, or a pixel picking process or the like. The tracing identification data (or the comparison data) is preferably generated by a function, which is difficult to specify original core identification data based on the generated tracing identification data (or the comparison data), i.e., a one-way function.

The pattern generating unit 2d generates a tracing pattern to be added to the output image data based on the tracing identification data generated by the identification data generating unit 2c. The tracing pattern is image data to be added to the output image data so as to specify a device that has generated or output the output image data. The tracing pattern is image data of the tracing identification data. The tracing pattern is Y-component color data such that an image of the tracing pattern formed on the printing paper is difficult to be recognized by human eyes. Although the tracing pattern to be printed out on the printing paper is Y-component color data in the present preferred embodiment to make the tracing pattern to be difficult to be recognized by human eyes, the tracing pattern may be composed with the output image data as color data of other color components.

The adding unit 2e adds the tracing pattern, which has been generated by the pattern generating unit 2d, to the output image data generated by the image processing unit 8. Specifically, the adding unit 2e executes a processing for adding the tracing pattern to the output image data by adding the tracing pattern (Y-component color data), which has been generated by the pattern generating unit 2d, to the Y-component color data among the output image data including each of CMYK color data generated by the image processing unit 8.

A manufacturer or the like of the Internet facsimile machine 1 associates and manages the tracing identification data and device information such as a serial number of the Internet facsimile machine 1. Therefore, when paper money or securities or the like is forged, the tracing pattern added to the output image data (when the output image data added with the tracing pattern is printed out, an image of the tracing pattern printed out on the printing paper) is analyzed. Then, the tracing identification data can be specified, and the specified tracing identification data can be verified with the device information. Accordingly, a device that has output the output image data can be specified.

The output control unit 2f controls an output of the output image data added with the tracing pattern by the output unit 2g. Specifically, the output control unit 2f determines whether or not the standard data matches the comparison data. When the output control unit 2f determines that the standard data matches the comparison data, the output control unit 2f permits the output unit 2g to output the output image data. When the output control unit 2f determines that the standard data does not match the comparison data, the output control unit 2f prohibits the output unit 2g to output the output image data added with the tracing pattern.

A fact that the standard data matches the comparison data indicates that the device identification data (in the present preferred embodiment, the shading correction data) stored in the device identification data storage unit 3a has not been altered. Therefore, when the standard data matches the comparison data, the tracing pattern, which has been converted into image data from the tracing identification data generated from the device identification data stored in the device identification data storage unit 3a, is also not altered and is proper data. As a result, in accordance with the tracing pattern added to the output image data, it is possible to specify the Internet facsimile machine 1 that has printed out an image based on the output image data.

When the first data and the second data include program data or the like other than the device identification data, the first data preferably includes at least the device identification data, and the second data preferably includes the device identification data and at least a portion that is common with the first data. However, when the second data and consequently the tracing identification data and the tracing pattern have been altered, the first data is always altered. Accordingly, the comparison data generated based on the first data does not match the standard data. Therefore, the first data preferably includes all data included in the second data.

The output unit 2g forms an image on printing paper by controlling the printer 9 in accordance with the output image data to which the tracing pattern has been added. The output image data, which is transmitted from the output unit 2g to the printer 9, is converted into an intensity modulation signal in a print image data generating circuit (not illustrated). Then, the intensity modulation signal is output to the LED print head 26 via the light intensity correction circuit 27, and the output image data is printed out. In the present preferred embodiment, a description will be made of an example in which a binary tracing pattern is added to binary output image data, and the output image data added with the binary tracing pattern is printed out. However, a multi-value tracing pattern may be added to multi-value output image data, and the output image data added with such a tracing pattern may be binalized and printed out.

After the adding unit 2e adds the tracing pattern to the output image data, the deleting unit 2h deletes the tracing identification data from the tracing identification data storage unit 4a. The deletion may be carried out by releasing a storage area of the tracing identification data storage unit 4a to be writable, or by actively deleting the tracing identification data in the storage area of the tracing identification data storage unit 4a. In order to accomplish an objective to prevent the device identification data from being specified based on the tracing identification data, it is preferable to actively delete the tracing identification data from the storage area of the tracing identification data storage unit 4a as in the case of the latter.

The tracing identification data storage unit 4a of the RAM 4 stores the tracing identification data generated by the identification data generating unit 2c. Further, the tracing identification data stored in the tracing identification data storage unit 4a is deleted from the tracing identification data storage unit 4a by the deleting unit 2h as described above.

In the following, with reference to FIG. 2 through FIG. 4 and FIG. 5A, a description will be made of an operation carried out by the Internet facsimile machine 1 when an original document has been set at the document scanning unit 5 and a command for starting a document scanning operation has been issued. Processing steps (steps S1 through S16) of each of the units of the Internet facsimile machine 1 described hereinafter with reference to the flowchart of FIG. 4 are carried out by commands generated by the control unit 2 in accordance the control program stored in the ROM 3.

First, the accepting unit 2a determines whether or not a command for starting a document scanning operation has been issued according to whether or not the start key of the operation unit 10 has been pressed (step S1). When the accepting unit 2a determines that the command for starting the document scanning operation has been issued (step S1: YES), an image of an original document is scanned to acquire input image data (step S2). Specifically, as illustrated in FIG. 2, the color line sensor 16 of the document scanning unit 5 scans an image of the original document, and generates an analog image signal. The analog image signal is output from the color line sensor 16, and a gain adjustment of the output analog image signal is carried out by the AFE circuit 17. Then, the A/D converter 18 carries out the A/D conversion of the analog image signal. The converted image signal is input to the shading correction circuit 19 as color image data (input image data) of the RGB color coordinate system.

The shading correction circuit 19 carries out a shading correction on the input image data, which has been input from the A/D converter 18, by using the shading correction data, which is stored in the device identification data storage unit 3a, and modification data, which has been previously obtained prior to a start of the scanning operation of the original document. The input color space conversion circuit 20 converts the shading-corrected input image data of the RGB color coordinate system into input image data of a L*a*b* color coordinate system. Then, the converted image data is output to the image processing unit 8.

Next, the image processing unit 8 generates output image data in accordance with the input image data output from the document scanning unit 5 (step S3). Specifically, the image processing circuit 22 executes a necessary image processing on the input image data of the L*a*b* color coordinate system output from the input color space conversion circuit 20. Then, the output color space conversion circuit 23 generates output image data including CMYK color data in accordance with the processed input image data of the L*a*b* color coordinate system.

Meanwhile, when the output image data is generated by the output color space conversion circuit 23 of the image processing unit 8, the comparison data generating unit 2b generates comparison data in accordance with first data (step S4). Specifically, the comparison data generating unit 2b inputs the first data including the device identification data stored in the device identification data storage unit 3a (in the present preferred embodiment, the shading correction data) to the hash function f1 (corresponds to the first function), and generates the comparison data to be verified with the standard data of the standard data storage unit 3a. That is, the comparison data as the hash value of the first data is generated. Then, the comparison data generating unit 2b stores the generated comparison data in a prescribed area of the RAM 4 (step S5).

Next, the identification data generating unit 2c generates tracing identification data in accordance with the second data including the device identification data stored in the device identification data storage unit 3a (in the present preferred embodiment, the shading correction data) (step S6). Specifically, the identification data generating unit 2c inputs the shading correction data to the second function (the hash function f2), and generates the tracing identification data. Then, the identification data generating unit 2c stores the generated tracing identification data in the tracing identification data storage unit 4a (step S7).

When the tracing identification data generated by the identification data generating unit 2c is stored into the tracing identification data storage unit 4a, the pattern generating unit 2d generates a tracing pattern to be added to the output image data in accordance with the generated tracing identification data (step S8). The adding unit 2e adds the tracing pattern generated by the pattern generating unit 2d to the output image data (step S9). When the tracing pattern is added to the output image data and the tracing identification data becomes unnecessary, the deleting unit 2h deletes the tracing identification data from the tracing identification data storage unit 4a (step S10).

The output control unit 2f verifies the comparison data, which has been generated by the comparison data generating unit 2b and stored into the RAM 4, with the standard data stored in the standard data storage unit 3c (step S11). A determination is carried out as to whether or not the comparison data matches the standard data (step S12).

When a determination is made that the comparison data matches the standard data (step S12: YES), i.e., when the device identification data (in the present preferred embodiment, the shading correction data) has not been altered, the output control unit 2f deletes the comparison data stored in the RAM 4 (step S13). This is to prevent the first data and consequently the device identification data from being specified based on the comparison data. The output control unit 2f permits an output of the output image data added with the tracing pattern. The output unit 2g outputs the output image data added with the tracing pattern to the printer 9 so as to print out the output image data. The printer 9 forms an image on printing paper in accordance with the output image data added with the tracing pattern, and discharges the printing paper (step S14).

Meanwhile, when a determination is made that the comparison data does not match the standard data (step S12: NO), i.e., when the device identification data (in the present preferred embodiment, the shading correction data) has been altered, the output control unit 2f prohibits an output of the output image data added with the altered tracing pattern (step S15). Accordingly, it is possible to prevent a device, which has added the altered tracing pattern to the output image data, from not being able to be specified even by analyzing the tracing pattern included in the output image data due to the tracing pattern having been altered.

After the process of step S15, the output control unit 2f executes an error processing (step S16). Specifically, the output control unit 2f executes a prohibition processing for deleting the output image data added with the tracing pattern and prohibiting a printing (copy) operation of the output image data. The output control unit 2f executes either a notification processing or an informing processing. Further, in the notification processing, the LCD of the notification unit 11 displays a warning message, and a speaker outputs a prescribed warning sound. In the informing processing, a fact that an altering action has been conducted is informed to a remote device (for example, a communication terminal device of a call center) by facsimile communication, Internet facsimile communication or electronic mail or the like. All of the prohibition processing, the notification processing and the informing processing may be carried out simultaneously, or any two of the processing may be carried out simultaneously.

As described above, according to the Internet facsimile machine 1, the tracing identification data generated based on the device identification data is added as a tracing pattern to the output image data generated based on the input image data. Therefore, by analyzing the tracing pattern added to the output image data, i.e., the tracing pattern printed out onto printing paper along with the output image data and specifying the tracing identification data, and then verifying the specified tracing identification data with a serial number saved and managed by a manufacturer of the Internet facsimile machine 1, it is possible to specify the Internet facsimile machine 1 that has output the output image data added with the tracing pattern. As a result, it is possible to suppress counterfeit actions such as reproduction of a specific image of paper money, securities or the like.

The tracing identification data stored in the tracing identification data storage unit 4a is deleted after the adding unit 2e adds the tracing pattern to the output image data. Therefore, it is extremely difficult to specify the tracing identification data. Thus, it is also extremely difficult to specify the device identification data from the tracing identification data. Moreover, the standard data is acquired as output data when the first data including the device identification data is input to the first function (the hash function f1), for example, and differs from the first data. Therefore, it is extremely difficult to specify the first data and consequently the device identification data based on the standard data. That is, identification data (the device identification data, the tracing identification data, and the tracing pattern) of the Internet facsimile machine 1 is not easily altered.

Meanwhile, when the device identification data is altered, the standard data does not match the comparison data. As a result, it is possible to prevent the output image data added with the altered tracing pattern from being printed out.

Figure 6A:
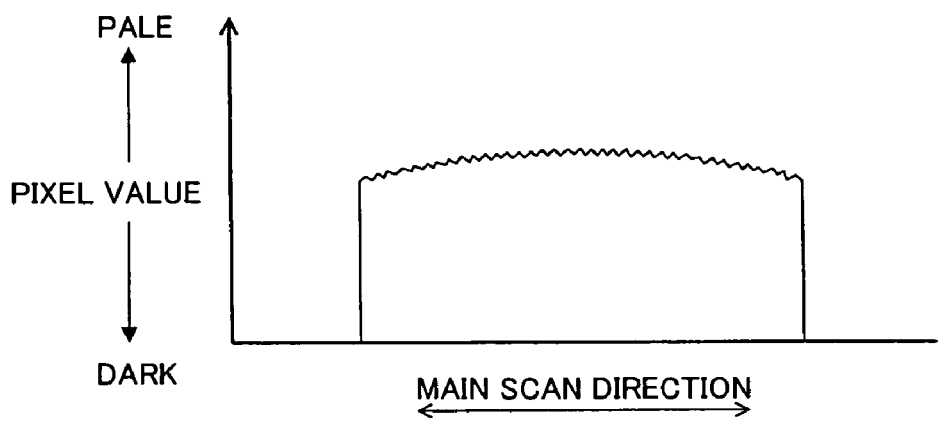
FIG. 6A illustrates a signal waveform of input image data before a shading correction.
Figure 6B:
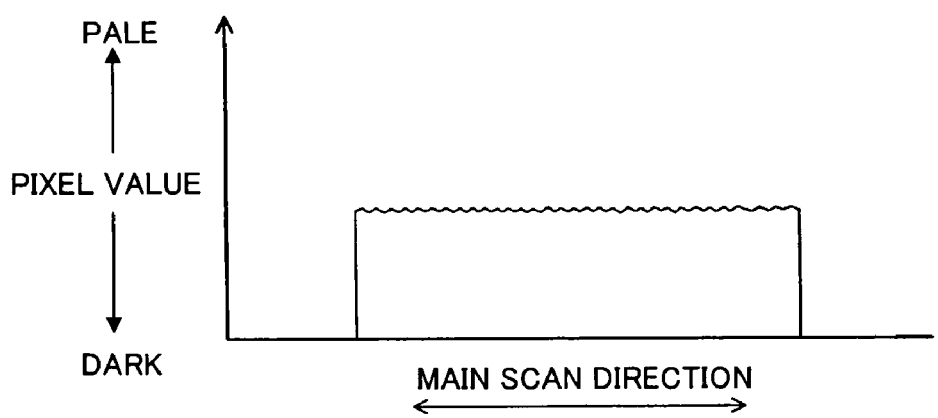
FIG. 6B illustrates a signal waveform of input image data after the shading correction.
Figure 6C:
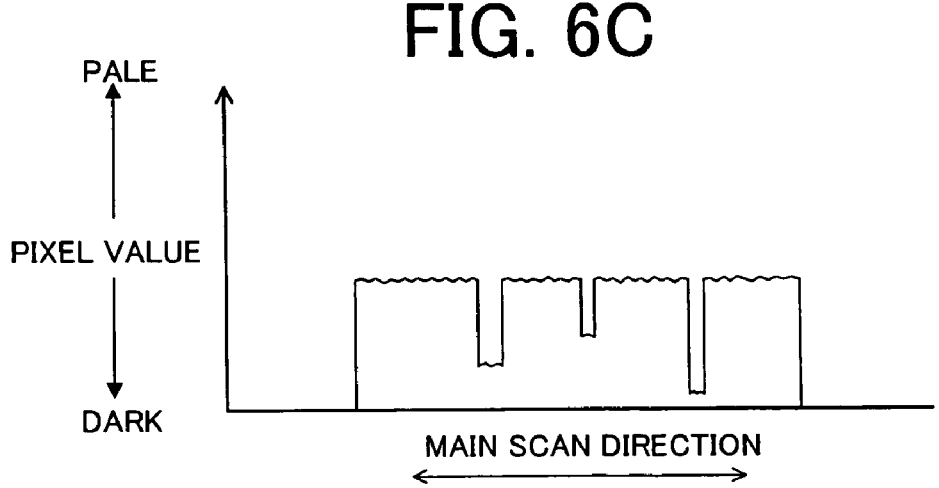
FIG. 6C illustrates a signal wave form of input image data of which shading has been corrected by altered shading correction data.

FIG. 6A illustrates an example of a signal waveform of input image data of one line in the main scan direction after an image of a blank original document has been scanned and before the shading correction. FIG. 6B illustrates an example of a signal waveform obtained by carrying out the shading correction on the input image data of FIG. 6A by using proper non-altered shading correction data. FIG. 6C illustrates an example of a signal waveform obtained by carrying out the shading correction on the input image data of FIG. 6A by using altered shading correction data.

As apparent from FIG. 6A through FIG. 6C, when using the data including the shading correction data as the second data, an image quality of the input image data deteriorates as a result of the shading correction data stored in the device identification data storage unit 3a being altered. As a result, a print-out that is true to the image of the original document cannot be printed out. Accordingly, even if the printing paper on which an image of paper money or the like is formed is output, it is possible to suppress such printing paper from being abused as counterfeit money or the like.

In the above-described preferred embodiment, the shading correction data is used as the device identification data. However, the device identification data may include light intensity correction data. In this case, when the light intensity correction data included in the device identification data is altered, variations in the light intensity among the plurality of the printing elements (in the present preferred embodiment, a plurality of the LED elements) is not normally corrected. As a result, a quality of the image formed on the printing paper deteriorates. Therefore, when paper money or the like is reproduced, it is possible to understand that the image formed on the paper money has been reproduced and to prevent the counterfeit paper money from being abused.

Since the first function and the second function are one-way hash functions, it is possible to effectively prevent the first data and the second data from being specified based on the standard data, which is the hash value of the first data, and the tracing identification data, which is the hash value of the second data. Moreover, even when only a slight portion of original data is changed, the output hash function changes greatly. Therefore, if the device identification data is altered, the standard data does not match the comparison data. As a result, it is possible to reliably prevent altered tracing identification data from being generated.

The present invention is not limited to the above-described preferred embodiment. For example, in the above-described preferred embodiment, the output unit forms an image on the printing paper in accordance with the output image data added with the tracing pattern. However, the output unit is not limited to such an example.

That is, the output unit may be a forwarding unit which forwards the output image data added with the tracing pattern to another device (for example, the client PC 33) via a prescribed network (for example, the LAN 32). Alternatively, the output unit may be a transmission unit which transmits the output image data added with the tracing pattern by facsimile or Internet facsimile. In this case, the device identification data is not the light intensity correction data, and is shading correction data or the like necessary for generating output image data that is true to the image of the original document.

As described above, when the output unit is a forwarding unit or a transmission unit, the output image data may be output as a Joint Photographic Expert Group (JPEF) file, a Tagged Image File Format (TIFF) file or the like. In such a case, the tracing pattern generated by the pattern generating unit 2d may be added as electronic watermark information to the generated output image data by the adding unit 2e.

In the above-described preferred embodiment, the tracing identification data is added as a tracing pattern image to the output image. However, as another example, before converting the tracing identification data and/or the second data into image data, the tracing identification data and/or the second data may be directly added to the output image data. The output image data added with the tracing identification data and/or the second data may be forwarded to another device such as the client PC 33 via the LAN 32 or the like. Then, the client PC 33 or the like may convert the tracing identification dada and/or the second data, which are added to the output image data, into image data. Then, the tracing identification data and/or the second data, which has been converted into image data, may be printed out onto printing paper along with the output image data.

In the above-described preferred embodiment, a description has been made of an example in which the first data and the second data are the device identification data, and the device identification data is shading correction data or light intensity correction data. However, the present invention is not limited to an example in which the first data and the second data include only the device identification data. For example, the first data and the second data may include program data, which executes a processing included in a series of processing from the scanning of the image of the original document by the document scanning unit 5 to the printing of the output image data onto the printing paper by the printer 9, and which causes the Internet facsimile machine 1 itself to not operate normally when being altered.

For example, data of high-order three bits of the shading correction data stored in the device identification data storage unit 3a may be combined with information in the program data stored in the program data storage unit 3b. Then, the combined data may be input to the hash function f1 and the hash function f2 to generate the standard data, the comparison data, and the tracing identification data (refer to FIG. 5B). In this case, the first data and the second data includes program data corresponding to at least one of the following programs: the comparison data generating program for functionally realizing the comparison data generating unit 2b, the identification data generating program for functionally realizing the identification data generating unit 2c, the pattern generating program for functionally realizing the pattern generating unit 2d, and the adding program for functionally realizing the adding unit 2e.

Accordingly, if the comparison data generating program of the first data and the second data is altered, the comparison data cannot be generated normally. If the identification data generating program of the first data and the second data is altered, the tracing identification data cannot be generated normally.

If the pattern generating program of the first data and the second data is altered, the tracing pattern cannot be generated normally. If the adding program of the first data and the second data is altered, the tracing pattern cannot be added property to the output image data. However, when these programs are altered, the standard data, which has been generated using the hash function f1 based on the first data at the shipment from the factory before these programs have been altered, does not match the comparison data, which has been generated using the hash function f1 based on the first data including the altered program data. Therefore, it is possible to prevent the output image data added with the altered tracing pattern from being printed out.

In the above-described preferred embodiment, a description has been made of an example in which the device identification data includes the shading correction data and the light intensity correction data. However, the device identification data is not limited to the above-described example. For example, the device identification data may include a serial number (identification number data of the Internet facsimile machine 1 itself). In this case, if the serial number is altered, the standard data does not match the comparison data. As a result, it is possible to prevent the output image data added with the altered tracing pattern from being printed out.

In the above-described preferred embodiment, a limitation has not been made in particular regarding a relation between a copying mode of an original document and a generation of the tracing identification data carried out by the identification data generating unit 2c. However, this relationship may be set as appropriate. For example, when producing only one copy of an original document including one sheet, or when producing a plurality of copies of an original document including a plurality of sheets, the tracing identification data may be generated only once. When copying an original document including a plurality of sheets, the tracing identification data may be generated only once for one job for copying the original document including a plurality of sheets, and one tracing pattern generated from the generated tracing identification data may be added to all output image data generated in the same job. Alternatively, in this case, the tracing identification data and the tracing pattern may be generated for each output image data (original document) and such tracing identification data and tracing pattern may be added to the output image data even within the same job.

In the above-described preferred embodiment, immediately after the tracing pattern, which has been generated in accordance with the tracing identification data, is added to the output image data, the tracing identification data is deleted from the tracing identification data storage unit 4a of the RAM 4. However, when a print job of the output image data has been completed, the tracing identification data may be deleted.

In the above-described preferred embodiment, when the standard data does not match the comparison data, the output image data added with the tracing pattern is prohibited from being printed out. However, when the standard data does not match the comparison data, the tracing identification data may be prohibited from being generated, or the tracing pattern may be prohibited from being added to the output image data.

In the above-described preferred embodiment, the adding unit always adds the tracing pattern (or the second data or the tracing identification data) to the output image data. However, a determination may be carried out on contents of the input image data or the output image data, and according to the determination result, a decision may be made as to whether or not to add the tracing pattern or the like.

In the above-described preferred embodiment, the document scanning unit 5 scans an image of an original document to generate input image data, and output image data is generated in accordance with the generated input image data. However, the input image data and/or the output image data may be acquired from the client PC 33 or the like via the LAN 32, and a tracing pattern may be added to the acquired output image data or output image data generated from the acquired input image data.

The configuration of the above-described Internet facsimile machine 1 is just one of the examples of the image processing device according to the present invention. The Internet facsimile machine 1 may be modified unless departing from a scope of the subject matter of the present invention. If an image processing device includes a function for composing the tracing pattern to the output image data, the image processing device may be realized as a copier, a facsimile machine, a scanner device, a printer device, or the like.

For example, the present invention is applicable to a device including a function for adding the tracing identification data, which is capable of identifying an image processing device, to the output image data as a tracing pattern.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image processing device comprising:
    an output image generating unit which generates an output image in accordance with an input image;
    a device identification information storage unit which stores device identification information, which is information for identifying the image processing device itself;
    a standard information storage unit which stores standard information;
    a comparison information generating unit which generates comparison information in accordance with first information including the device identification information retrieved from the device identification information storage unit;
    a tracing identification information generating unit which generates tracing identification information, which has contents different from the standard information, in accordance with second information including the device identification information retrieved from the device identification information storage unit;
    an adding unit which adds the tracing identification information generated by the tracing identification information generating unit to the output image;
    an output unit which outputs the output image;
    a determining unit which determines whether or not the comparison information generated by the comparison information generating unit matches the standard information retrieved from the standard information storage unit; and a control unit which controls to prohibit the output image to be output by the output unit according to a determination result of the determining unit.

2. An image processing device comprising:

an output image generating unit which generates an output image in accordance with an input image;

a device identification information storage unit which stores device identification information, which is information for identifying the image processing device itself;

a standard information storage unit which stores standard information;

a comparison information generating unit which generates comparison information by converting first information including the device identification information retrieved from the device identification information storage unit in accordance with a first function;

a tracing identification information generating unit which generates tracing identification information by converting second information including the device identification information retrieved from the device identification information storage unit in accordance with a second function;

an adding unit which adds the tracing identification information generated by the tracing identification information generating unit to the output image;

an output unit which outputs the output image;

a determining unit which determines whether or not the comparison information generated by the comparison information generating unit matches the standard information retrieved from the standard information storage unit; and a control unit which controls to prohibit the output image to be output by the output unit according to a determination result of the determining unit.

3. The image processing device according to claim 2, wherein the first function is a one-way function.

4. The image processing device according to claim 2, wherein the second function is a one-way function.

5. The image processing device according to claim 1, further comprising:

a tracing identification information storage unit which stores the tracing identification information generated by the tracing identification information generating unit; and a deleting unit which, after the adding unit adds the tracing identification information retrieved from the tracing identification information storage unit to the output image, deletes the tracing identification information from the tracing identification information storage unit.

6. The image processing device according to claim 1, further comprising a scanning unit which scans an image of an original document and generates the input image, wherein the device identification information includes correction information unique to the image processing device itself used in a processing for generating the output image that is true to the image of the original document in a processing for generating the output image by the output image generating unit.

7. The image processing device according to claim 6, wherein the device identification information includes shading correction information used for a shading correction of the input image as the correction information.

8. The image processing device according to claim 1, wherein the output unit adjusts emission energy of each of a plurality of printing elements, and forms an image based on the output image on printing paper, and the device identification information includes light intensity correction information unique to the image processing device itself used in a processing for correcting variation in light intensity among the plurality of the printing elements.

9. The image processing device according to claim 6, wherein one or both of the first information and the second information includes program data, which executes a processing included in a series of processing from scanning of an image of an original document by the scanning unit to outputting of the output image by the output unit and causes the image processing device itself to not operate normally when being altered.

10. The image processing device according to claim 9, wherein the program data includes program data of at least one of following programs:

a tracing identification information generating program for functionally realizing the tracing identification information generating unit;

a comparison information generating program for functionally realizing the comparison information generating unit; and an adding program for functionally realizing the adding unit.

11. An image processing method comprising the steps of:

generating an output image in accordance with an input image;

generating comparison information in accordance with first information including device identification information retrieved from a device identification information storage unit;

generating tracing identification information, which includes contents different from standard information stored in a standard information storage unit, in accordance with second information including the device identification information retrieved from the device identification information storage unit;

adding the tracing identification information generated at the tracing identification information generating step to the output image;

outputting the output image;

determining whether or not the comparison information generated at the comparison information generating step matches the standard information retrieved from the standard information storage unit; and controlling to prohibit the output image from being output at the outputting step in accordance with a determination result of the determining step.

12. An image processing method comprising the steps of:

generating an output image in accordance with an input image;

generating comparison information by converting first information including device identification information retrieved from a device identification information storage unit in accordance with a first function;

generating tracing identification information by converting second information including the device identification information retrieved from the device identification information storage unit in accordance with a second function;

adding the tracing identification information generated at the tracing identification information generating step to the output image;

outputting the output image;

determining whether or not the comparison information generated at the comparison information generating step matches standard information retrieved from a standard information storage unit; and controlling to prohibit the output image from being output in the outputting step according to a determination result of the determining step.

13. The image processing method according to claim 12, wherein the first function is a one-way function.

14. The image processing method according to claim 12, wherein the second function is a one-way function.

15. The image processing method according to claim 11, further comprising the steps of:

storing the tracing identification information generated at the tracing identification information generating step in a tracing identification information storage unit; and after the tracing identification information retrieved from the tracing identification information storage unit is added to the output image at the adding step, deleting the tracing identification information from the tracing identification information storage unit.

16. The image processing method according to claim 11, further comprising the step of scanning an image of an original document and generating the input image, wherein the device identification information includes correction information unique to an image processing device and used in a processing for generating the output image that is true to the image of the original document in a processing for generating the output image at the output image generating step.

17. The image processing method according to claim 16, wherein as the correction information, the device identification information includes shading correction information used for a shading correction of the input image.

18. The image processing method according to claim 11, wherein the outputting step includes the steps of:

adjusting emission energy of each of a plurality of printing elements, and forming an image based on the output image on printing paper, wherein the device identification information includes light intensity correction information unique to the image processing device and used in a processing for correcting variation in light intensity among the plurality of the printing elements.

19. The image processing method according to claim 16, wherein one or both of the first information and the second information includes program data, which executes a processing included in a series of processing from scanning of the image of the original document at the scanning step to outputting of the output image at the outputting step and causes the image processing device itself to not operate normally when being altered.

20. The image processing method according to claim 19, wherein the program data includes program data of at least one of following programs: a tracing identification information generating program for functionally realizing the tracing identification information generating step, a comparison information generating step of functionally realizing the comparison information generating step, and an adding program for functionally realizing the adding step.

* * * * *